US008452240B2

(12) United States Patent
Takahashi

(10) Patent No.: US 8,452,240 B2
(45) Date of Patent: May 28, 2013

(54) RADIO COMMUNICATION DEVICE, RADIO COMMUNICATION SYSTEM, AND RADIO COMMUNICATION METHOD

(75) Inventor: Hiroaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 271 days.

(21) Appl. No.: 12/883,870

(22) Filed: Sep. 16, 2010

(65) Prior Publication Data

US 2011/0076965 A1 Mar. 31, 2011

(30) Foreign Application Priority Data

Sep. 25, 2009 (JP) ................................ 2009-220479

(51) Int. Cl.
*H04B 1/40* (2006.01)

(52) U.S. Cl.
USPC ............... 455/75; 455/81; 455/500; 370/350; 370/503; 375/356

(58) Field of Classification Search
USPC ... 455/75, 81, 500, 502, 523, 556.1; 370/350, 370/503; 375/356
See application file for complete search history.

(56) References Cited

U.S. PATENT DOCUMENTS 7,499,723 B2 * 3/2009 Higure .......................... 455/523
2009/0279572 A1 * 11/2009 Takada et al. ................ 370/503
2010/0060453 A1 * 3/2010 Kushida et al. ............ 340/572.1

FOREIGN PATENT DOCUMENTS

JP 2006-270880 A 10/2006

* cited by examiner

*Primary Examiner* — Tuan H Nguyen
(74) *Attorney, Agent, or Firm* — Sony Corporation

(57) ABSTRACT

There is provided a radio communication device that includes a plurality of leaky coaxial cables that transmit and receive radio signals, a detection unit that detects a difference in reception timing of a radio signal transmitted from another radio communication device among the plurality of leaky coaxial cables, and a transmission timing adjustment unit that adjusts transmission timing of radio signals to be respectively transmitted from the plurality of leaky coaxial cables based on the difference in the reception timing detected by the detection unit.

10 Claims, 10 Drawing Sheets

1

LEAKY COAXIAL CABLE #1
TERMINATOR #1
20
10
BASE STATION
LEAKY COAXIAL CABLE #2
TERMINATOR #2
LEAKY COAXIAL CABLE #3
TERMINATOR #3

1
TERMINATOR #1
TERMINATOR #2
TERMINATOR #3
20
LEAKY COAXIAL CABLE #1
LEAKY COAXIAL CABLE #2
LEAKY COAXIAL CABLE #3
10
BASE STATION

RECEIVED SIGNAL OF LEAKY COAXIAL CABLE #1
RECEIVED SIGNAL OF LEAKY COAXIAL CABLE #2
RECEIVED SIGNAL OF LEAKY COAXIAL CABLE #3
L-STF 12tones, 8us
L-LTF 52tones, 8us
L-SIG 52tones, 4us
L-Data 52tones
CORRELATION VALUE
t
t1
t2
t3
d1
d2

OFDM SYMBOL
GUARD INTERVAL
RADIO SIGNAL TRANSMITTED FROM LEAKY COAXIAL CABLE #1
RADIO SIGNAL TRANSMITTED FROM LEAKY COAXIAL CABLE #2
RADIO SIGNAL TRANSMITTED FROM LEAKY COAXIAL CABLE #3
1
2
3
d2
d1
RADIO SIGNAL RECEIVED FROM LEAKY COAXIAL CABLE #1
RADIO SIGNAL RECEIVED FROM LEAKY COAXIAL CABLE #2
RADIO SIGNAL RECEIVED FROM LEAKY COAXIAL CABLE #3

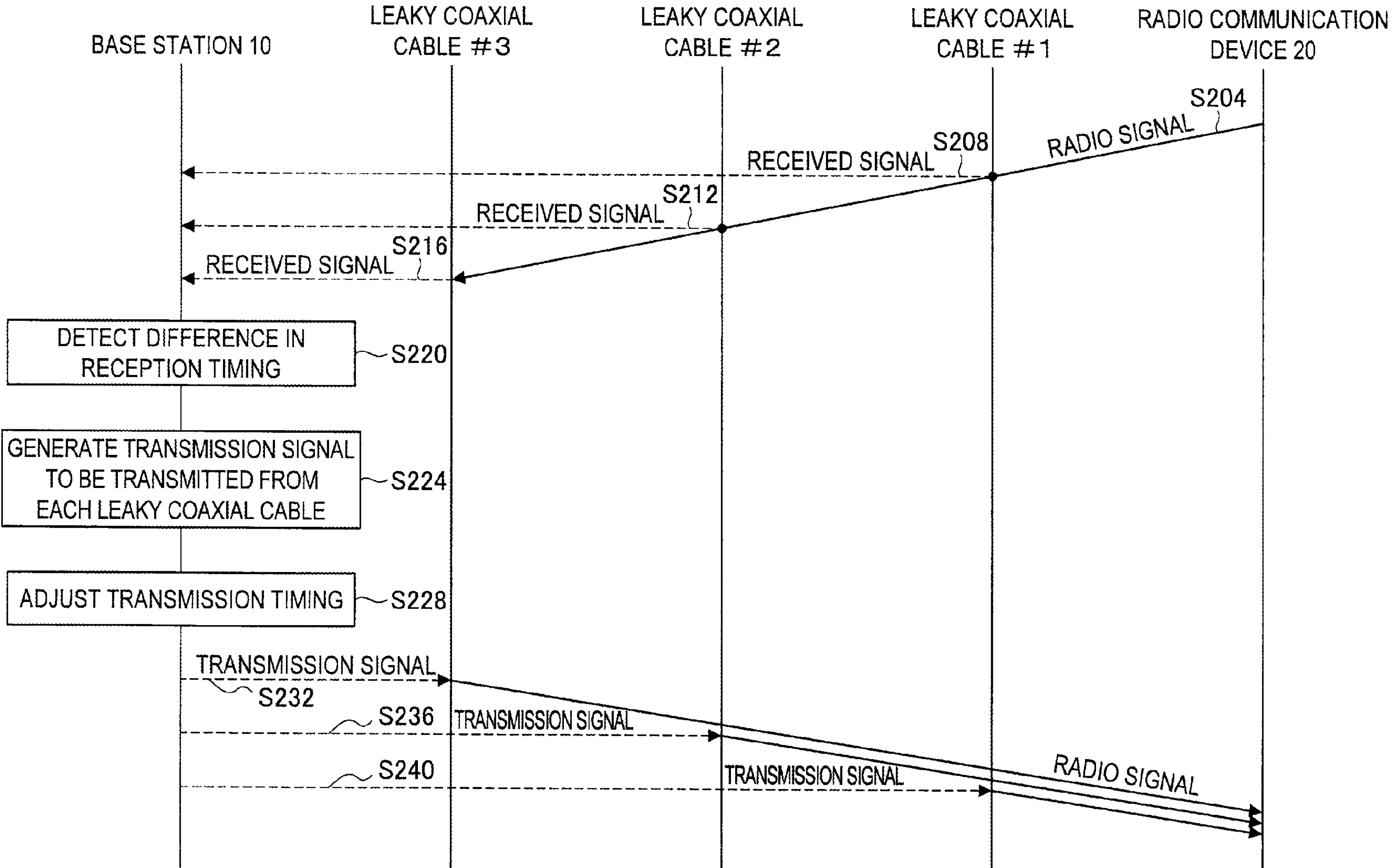
FIG. 9
BASE STATION 10
LEAKY COAXIAL CABLE #3
LEAKY COAXIAL CABLE #2
LEAKY COAXIAL CABLE #1
RADIO COMMUNICATION DEVICE 20
S204
RADIO SIGNAL
S208
RECEIVED SIGNAL
S212
RECEIVED SIGNAL
S216
RECEIVED SIGNAL
DETECT DIFFERENCE IN RECEPTION TIMING
S220
GENERATE TRANSMISSION SIGNAL TO BE TRANSMITTED FROM EACH LEAKY COAXIAL CABLE
S224
ADJUST TRANSMISSION TIMING
S228
TRANSMISSION SIGNAL
S232
S236
TRANSMISSION SIGNAL
S240
TRANSMISSION SIGNAL
RADIO SIGNAL

RADIO COMMUNICATION DEVICE, RADIO COMMUNICATION SYSTEM, AND RADIO COMMUNICATION METHOD

BACKGROUND OF THE INVENTION

1. Field of the Invention

The present invention relates to a radio communication device, a radio communication system, and a radio communication method.

2. Description of the Related Art

Recently, MIMO (Multiple-Input, Multiple-Output) that is the use of a plurality of antennas for communication between radio communication devices and OFDM (Orthogonal Frequency Division Multiplexing) that makes use of the orthogonality of frequencies have been actively studied.

Because each of the plurality of antennas at a transmitting end has a different path length from an antenna at a receiving end, when the plurality of antennas at the transmitting end simultaneously transmit radio signals, the reception timing by the antenna at the receiving end differs depending on the antenna at the transmitting end of the radio signal. The difference in the reception timing is preferably within the range of an OFDM guard interval in terms of interference avoidance. Note that a technique for reducing the difference in the reception timing is disclosed in Japanese Unexamined Patent Application Publication No. 2006-270880.

On the other hand, a way to thoroughly cover the indoor areas by a wireless LAN system may be placing a plurality of base stations in a dispersed arrangement, laying leaky coaxial cables or the like.

SUMMARY OF THE INVENTION

However, in the case of laying a plurality of leaky coaxial cables in a radio communication device for MIMO communication, a path length between each leaky coaxial cable and an antenna at a receiving end differs largely. Accordingly, a difference in the reception timing of radio signals transmitted from the respective leaky coaxial cables by the antenna at the receiving end is large. Note that, if the plurality of leaky coaxial cables are placed in a bundle, a difference in the path length between each leaky coaxial cable and the antenna at the receiving end becomes smaller; however, the characteristics of MIMO communication are degraded when the leaky coaxial cables are close to one another, which results in a decrease in throughput.

In light of the foregoing, it is desirable to provide a novel and improved radio communication device, radio communication system, and radio communication method that enable adjustment of the transmission timing of a radio signal by each of a plurality of leaky coaxial cables.

According to an embodiment of the present invention, there is provided a radio communication device including, a plurality of leaky coaxial cables that transmit and receive radio signals, a detection unit that detects a difference in reception timing of a radio signal transmitted from another radio communication device among the plurality of leaky coaxial cables, and a transmission timing adjustment unit that adjusts transmission timing of radio signals to be respectively transmitted from the plurality of leaky coaxial cables based on the difference in the reception timing detected by the detection unit.

The transmission timing adjustment unit may adjust the transmission timing in such a way that a difference in reception timing of the radio signals to be respectively transmitted from the plurality of leaky coaxial cables in such other radio communication device is within a predetermined range.

The transmission timing adjustment unit may adjust the transmission timing in such a way that a difference in reception timing of the radio signals to be respectively transmitted from the plurality of leaky coaxial cables in such other radio communication device is within a time range of a guard interval added to each OFDM symbol.

The transmission timing adjustment unit may adjust the transmission timing in such a way that reception timing of the radio signals to be respectively transmitted from the plurality of leaky coaxial cables in such other radio communication device coincides with one another.

The radio communication device may perform antenna calibration with such other radio communication device, and in the antenna calibration, calibration signals may be sequentially transmitted from the plurality of leaky coaxial cables based on a response from such other radio communication device, and the detection unit may detect the difference in the reception timing based on a response from such other radio communication device responding to the calibration signals sequentially transmitted from the plurality of leaky coaxial cables.

The radio communication device may include a synchronous unit that detects each synchronous timing of received signals received by the plurality of leaky coaxial cables. The detection unit may detects difference in the synchronous timing of the received signals detected by the synchronous unit as the difference in the reception timing.

The radio communication device may include a reception timing adjustment unit that adjusts timing to supply each of the received signals received by the plurality of leaky coaxial cables to the synchronous unit based on the difference in the reception timing detected by the detection unit.

According to another embodiment of the present invention, there is provided a radio communication system including, a first radio communication device including a plurality of antennas, and a second radio communication device including a plurality of leaky coaxial cables that transmit and receive radio signals, a detection unit that detects a difference in reception timing of a radio signal transmitted from the first radio communication device among the plurality of leaky coaxial cables, and a transmission timing adjustment unit that adjusts transmission timing of radio signals to be respectively transmitted from the plurality of leaky coaxial cables based on the difference in the reception timing detected by the detection unit.

According to another embodiment of the present invention, there is provided a radio communication method comprising the steps of receiving a radio signal transmitted from another radio communication device by a plurality of leaky coaxial cables, detecting a difference in reception timing of the radio signal among the plurality of leaky coaxial cables, and adjusting transmission timing of radio signals to be respectively transmitted from the plurality of leaky coaxial cables based on the difference in the reception timing.

According to the embodiments of the present invention described above, it is possible to adjust the transmission timing of a radio signal by each of a plurality of leaky coaxial cables.

BRIEF DESCRIPTION OF THE DRAWINGS

FIG. 9 is a sequence chart showing an operation of a radio communication system according to an embodiment.

DETAILED DESCRIPTION OF THE EMBODIMENT(S)

Figure 1:
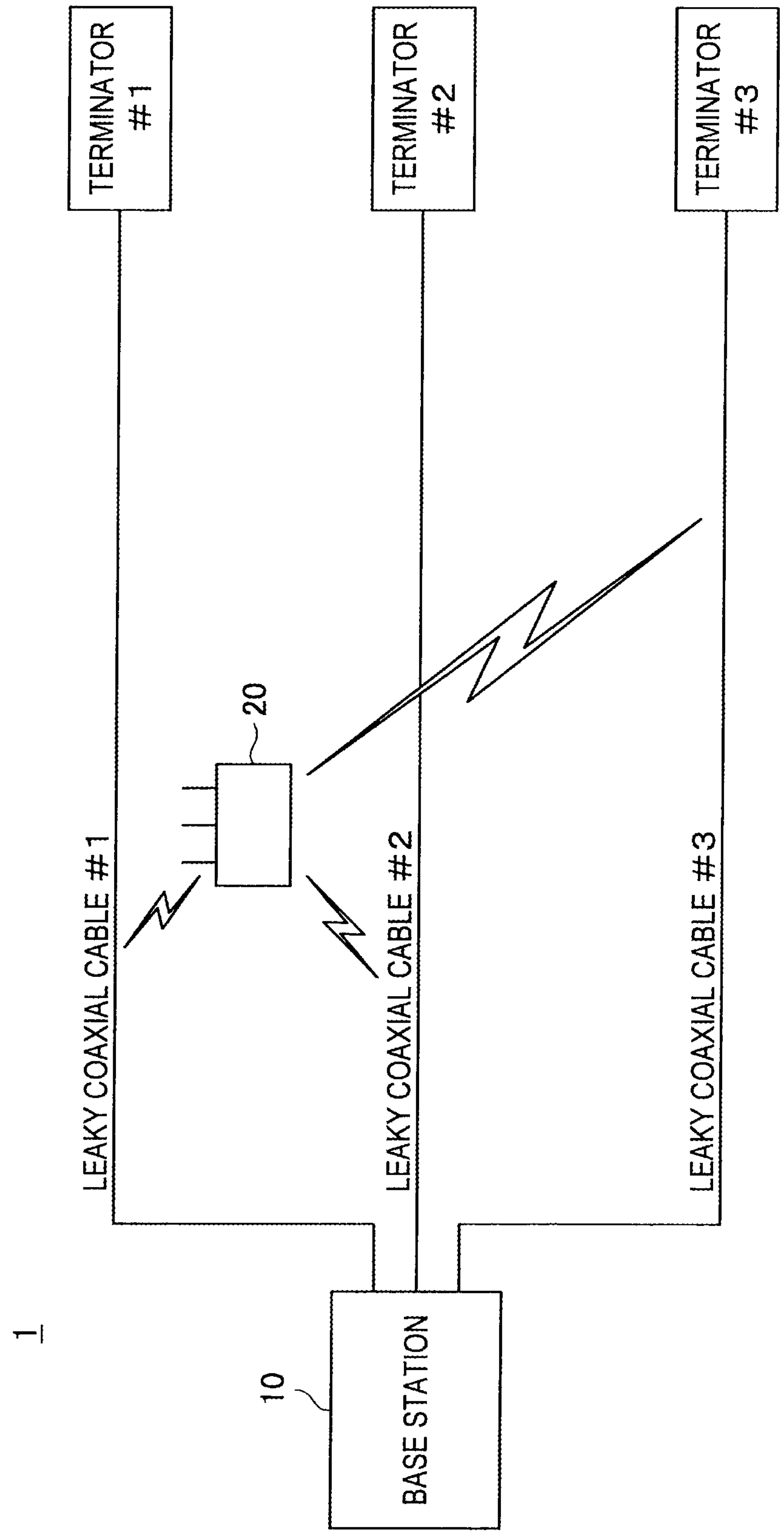
FIG. 1 is an explanatory view showing a configuration of a radio communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.

1. Configuration of Radio Communication System
2. Background
3. Configuration of Base Station
4. Operation of Radio Communication System
5. Alternative Example
6. Summary <1. Configuration of Radio Communication System>

A configuration of a radio communication system 1 according to an embodiment of the present invention is described hereinafter with reference to FIG. 1.

FIG. 1 is an explanatory view showing a configuration of the radio communication system 1 according to the embodiment of the present invention. Referring to FIG. 1, the radio communication system 1 according to the embodiment of the present invention includes a base station 10, terminators #1 to #3, and a radio communication device 20.

The base station 10 includes leaky coaxial cables #1 to #3 that are respectively connected to the terminators #1 to #3. The leaky coaxial cables #1 to #3 have a plurality of slits, and part of an electrical signal is radiated as a radio signal from the slits. Further, a radio signal transmitted from the radio communication device 20 is converted into an electrical signal in the slits and supplied as a received signal to the base station 10.

The base station 10 uses the leaky coaxial cables #1 to #3 in this manner, and the base station 10 can thereby communicate with the radio communication device 20 that exists in the range along the leaky coaxial cables #1 to #3. Specifically, by use of the leaky coaxial cables #1 to #3, the spatial range where the base station 10 can communicate can be narrowed down. It is not preferable that video data transmitted and received in studios of a broadcast station leaks to the outside. Thus, the base station 10 that include the leaky coaxial cables #1 to #3 may be implemented in a studio of a broadcast station, for example.

Further, the radio communication device 20 includes a plurality of antennas. Therefore, the base station 10 and the radio communication device 20 can perform MIMO communication. Note that a distance among the plurality of antennas of the radio communication device 20 may be sufficiently shorter than a distance among the leaky coaxial cables #1 to #3 of the base station 10. Specifically, a distance among the antennas may be the length such that the reception timing of radio signals transmitted from the plurality of antennas in one leaky coaxial cable can be regarded as being the same, and the reception timing of a radio signal transmitted from one leaky coaxial cable in the plurality of antennas can be regarded as being the same.

The radio communication device 20 may be an information processing device such as a PC (Personal Computer), a home video processing device (e.g. a display device, a DVD recorder, a videocassette recorder etc.), a PDA (Personal Digital Assistants), a home game machine, an imaging device, or an electrical household appliance. Further, the radio communication terminal 20 may be an information processing device such as a cellular phone, a PHS (Personal Handyphone System), a portable music playback device, a portable video processing device, or a portable game machine.

Further, the base station 10 and the radio communication device 20 may be in conformity with IEEE (Institute of Electrical and Electronics Engineers) 802.11n.

<2. Background>

The background of the embodiment is described hereinbelow with reference to FIGS. 2 and 3.

Figure 2:
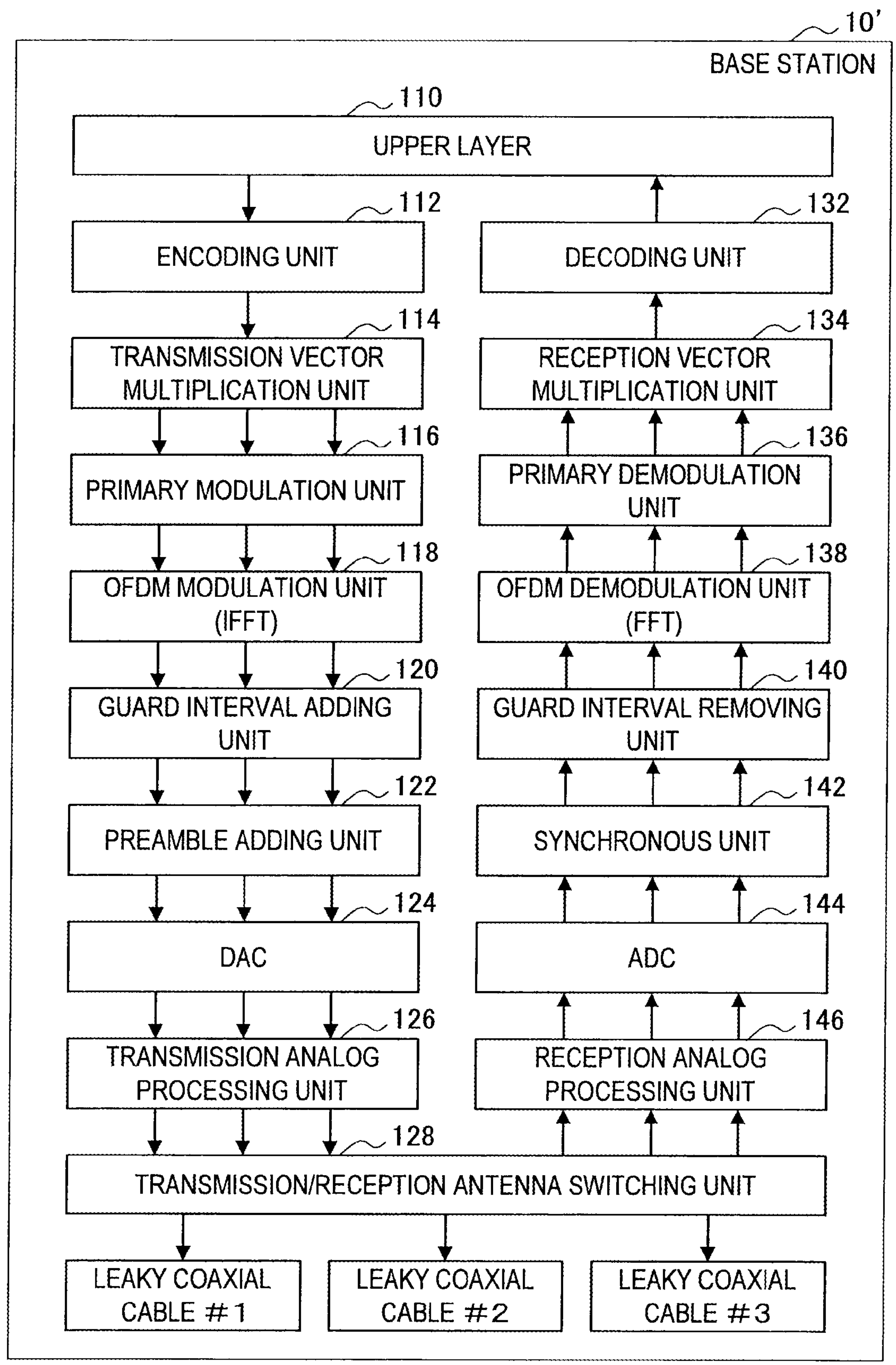
FIG. 2 is a functional block diagram showing a configuration of a base station related to the present invention.

FIG. 2 is a functional block diagram showing a configuration of a base station 10' related to the present invention. Referring to FIG. 2, the base station 10' related to the embodiment includes an upper layer 110, an encoding unit 112, a transmission vector multiplication unit 114, a primary modulation unit 116, an OFDM modulation unit 118, a guard interval adding unit 120, a preamble adding unit 122, a DAC 124, a transmission analog processing unit 126, a transmission/reception antenna switching unit 128, and leaky coaxial cables #1 to #3, as a configuration for transmission.

The encoding unit 112 encodes transmission data supplied from the upper layer 110. Then, the transmission vector multiplication unit 114 performs sorting of the encoded transmission data to branches and multiplication of a transmission vector for MIMO transmission.

The primary modulation unit 116 divides the transmission data in each branch, allocates the divided transmission data to sub-carriers, and modulates the transmission data allocated to each sub-carrier according to a constellation. A modulation scheme may be BPSK (Binary Phase Shift Keying), QPSK (Quadrature Phase Shift Keying), 16-QAM (Quadrature Amplitude Modulation, 64-QAM or the like.

The OFDM modulation unit 118 generates a time-domain OFDM signal in each branch by inverse Fourier transform of the modulated signal of each sub-carrier. Then, the guard interval adding unit 120 adds a guard interval (e.g. 400 ns, 800 ns) to each OFDM symbol constituting the OFDM signal in each branch. Further, the preamble adding unit 122 adds a preamble for synchronization at the head of the OFDM signal in each branch and generates a baseband transmission signal.

The DAC (Digital-Analog Converter) 124 converts the baseband transmission signal supplied from the preamble adding unit 122 from digital to analog in each branch. Then, the transmission analog processing unit 126 converts the analog baseband transmission signal to a high-frequency transmission signal in each branch.

The transmission/reception antenna switching unit 128 connects the transmission analog processing unit 126 and the leaky coaxial cables #1 to #3 at the time of transmission. As a result, the high-frequency transmission signal in each branch obtained by the transmission analog processing unit 126 is transmitted as a radio signal from the leaky coaxial cables #1 to #3.

Further, the base station 10' related to the embodiment includes the upper layer 110, the transmission/reception antenna switching unit 128, a decoding unit 132, a reception vector multiplication unit 134, a primary demodulation unit 136, an OFDM demodulation unit 138, a guard interval removing unit 140, a synchronous unit 142, an ADC 144, a reception analog processing unit 146, and leaky coaxial cables #1 to #3, as a configuration for reception.

The transmission/reception antenna switching unit 128 connects the reception analog processing unit 146 and the leaky coaxial cables #1 to #3 at the time of reception. As a result, high-frequency received signals received by the leaky coaxial cables #1 to #3 are supplied to the reception analog processing unit 146.

The reception analog processing unit 146 performs analog processing such as amplification, filtering and down conversion on the supplied high-frequency received signal in each branch and thereby converts the high-frequency received signal to a baseband received signal.

The ADC (Analog-Digital Converter) 144 converts the baseband received signal supplied from the reception analog processing unit 146 from analog to digital in each branch.

The synchronous unit 142 detects synchronous timing to cut out a packet frame (OFDM symbol) following a preamble based on a preamble for synchronization that is added at the head of the received signal in each branch.

Then, the guard interval removing unit 140 removes a guard interval from the received signal in each branch according to the synchronous timing detected by the synchronous unit 142 and cuts out the OFDM symbol.

Further, the OFDM demodulation unit 138 performs Fourier transform of the time-domain received signal with respect to each OFDM symbol cut out by the guard interval removing unit 140 and thereby obtains a modulated signal of each subcarrier.

The primary demodulation unit 136 demodulates the modulated signal of each subcarrier and obtains a bit string. Then, the reception vector multiplication unit 134 multiplies the demodulated signal in each branch by a reception vector for MIMO reception and obtains encoded received data. The decoding unit 132 then decodes the encoded received data and supplies the decoded received data to the upper layer 110.

In the communication device 20 that communicates with the above-described base station 10' related to the embodiment, there has been a concern that reception characteristics are degraded for the reason described hereinbelow with reference to FIG. 3.

Figure 3:
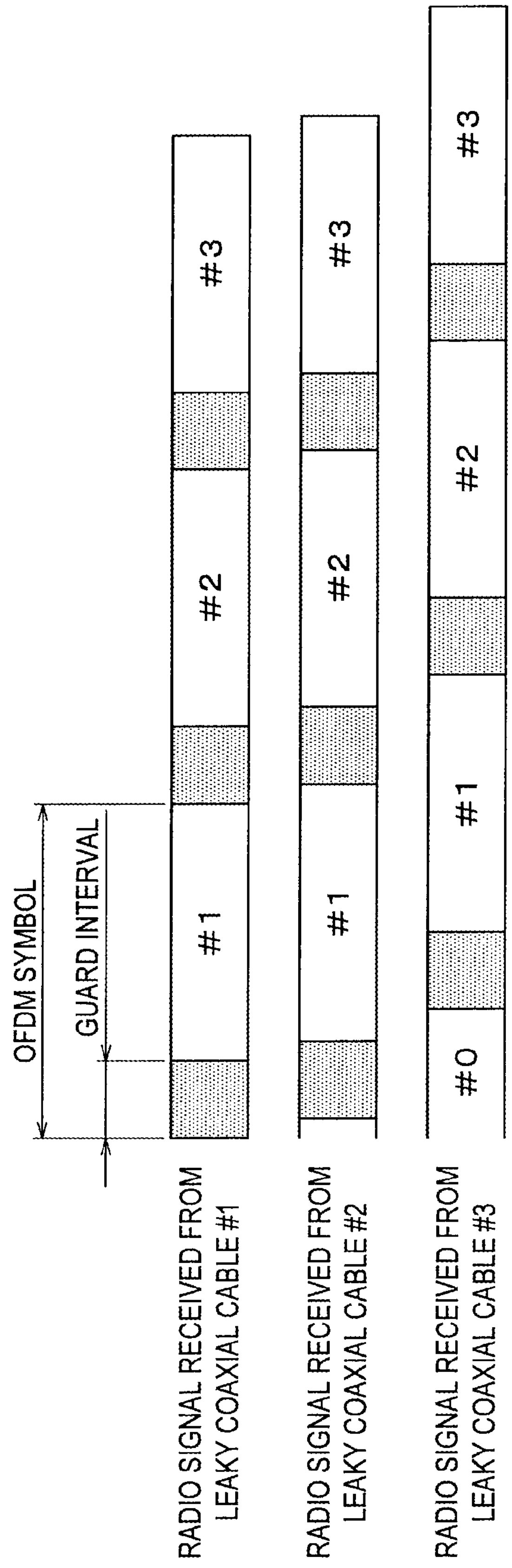
FIG. 3 is an explanatory view showing radio signals received by a radio communication device from each leaky coaxial cable of the base station related to the present invention.

FIG. 3 is an explanatory view showing radio signals received by the radio communication device 20 from the respective leaky coaxial cables of the base station 10' related to the present invention. Referring to FIG. 3, the reception timing of the radio signals transmitted from the leaky coaxial cables #1 to #3 and received by the radio communication device 20 is different. This is caused by a difference in a path length between each of the leaky coaxial cables #1 to #3 and the radio communication device 20.

Further, in the example shown in FIG. 3, a difference in the reception timing of radio signals transmitted from the leaky coaxial cables #1 to #3 in the radio communication device 20 exceeds the time range of a guard interval. Thus, there has been a concern that interference occurs between received signals from the leaky coaxial cables #1 to #3.

For example, after the guard interval of an OFDM symbol #1 transmitted from the leaky coaxial cable #1 is received, the guard interval of the OFDM symbol #1 transmitted from the leaky coaxial cable #3 is received. Specifically, the reception period of an OFDM symbol #0 transmitted from the leaky coaxial cable #3 partly coincides with the reception period of the OFDM symbol #1 transmitted from the leaky coaxial cables #1 and #2. Therefore, there has been a possibility that interference occurs between a received signal from the leaky coaxial cable #3 and received signals from the leaky coaxial cables #1 and #2.

Under such a background, the base station 10 according to the embodiment has been invented. The base station 10 according to the embodiment adjusts the transmission timing of a radio signal by each of a plurality of leaky coaxial cables, thereby suppressing degradation of reception characteristics in the radio communication device 20. A configuration of the base station 10 is described in detail hereinbelow.

<3. Configuration of Base Station>

Figure 4:
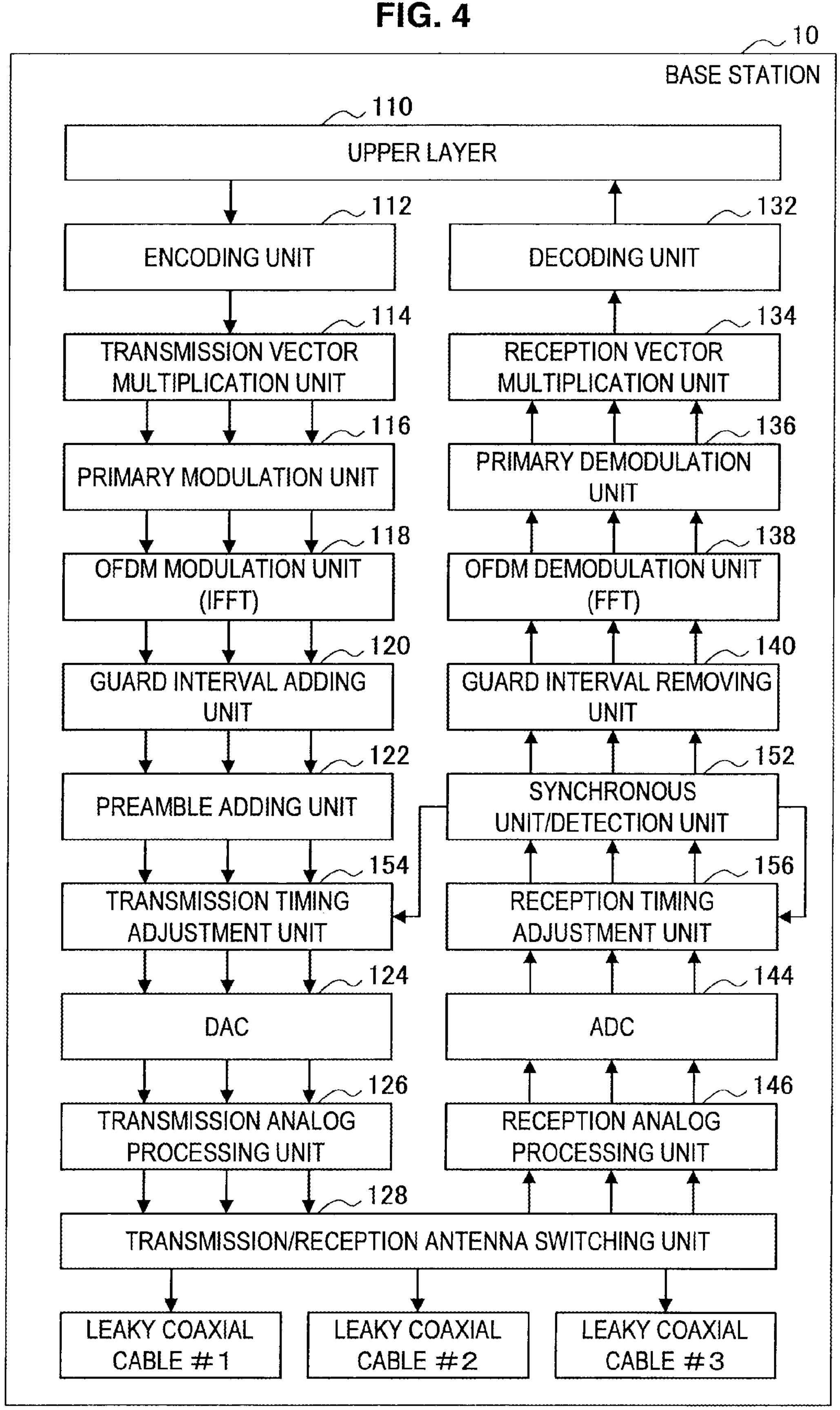
FIG. 4 is a functional block diagram showing a configuration of a base station according to an embodiment of the present invention.

FIG. 4 is a functional block diagram showing a configuration of a base station 10 according to the embodiment. Referring to FIG. 4, the base station 10 according to the embodiment includes an upper layer 110, an encoding unit 112, a transmission vector multiplication unit 114, a primary modulation unit 116, an OFDM modulation unit 118, a guard interval adding unit 120, a preamble adding unit 122, a DAC 124, a transmission analog processing unit 126, a transmission/reception antenna switching unit 128, a transmission timing adjustment unit 154, and leaky coaxial cables #1 to #3, as a configuration for transmission.

The upper layer 110, the encoding unit 112, the transmission vector multiplication unit 114, the primary modulation unit 116, the OFDM modulation unit 118, the guard interval adding unit 120, the preamble adding unit 122, the DAC 124, the transmission analog processing unit 126, the transmission/reception antenna switching unit 128, and the leaky coaxial cables #1 to #3 can be configured in substantially the same manner as those in the base station 10' related to the embodiment described earlier in <2. Background>, and detailed explanation thereof is omitted.

Further, the base station 10 according to the embodiment includes the upper layer 110, the transmission/reception antenna switching unit 128, a decoding unit 132, a reception vector multiplication unit 134, a primary demodulation unit 136, an OFDM demodulation unit 138, a guard interval removing unit 140, an ADC 144, a reception analog processing unit 146, a synchronous unit/detection unit 152, a reception timing adjustment unit 156, and leaky coaxial cables #1 to #3, as a configuration for reception.

The upper layer 110, the transmission/reception antenna switching unit 128, the decoding unit 132, the reception vector multiplication unit 134, the primary demodulation unit 136, the OFDM demodulation unit 138, the guard interval removing unit 140, the ADC 144, the reception analog processing unit 146, and the leaky coaxial cables #1 to #3 can be configured in substantially the same manner as those in the base station 10' related to the embodiment described earlier in <2. Background>, and detailed explanation thereof is omitted.

Note that, in the following, it is assumed that a distance among a plurality of antennas of the radio communication device 20 is sufficiently shorter than a distance among the leaky coaxial cables #1 to #3 of the base station 10, and the plurality of antennas are treated as a single antenna in terms of a path length from the leaky coaxial cables #1 to #3.

(Detection of Difference in Reception Timing)

The synchronous unit/detection unit 152 performs synchronous detection of received signals received by the respective leaky coaxial cables #1 to #3 and detects a difference in synchronous timing as a difference in reception timing among the leaky coaxial cables #1 to #3. Processing of the synchronous unit/detection unit 152 is specifically described hereinafter with reference to FIGS. 5 and 6.

Figure 5:
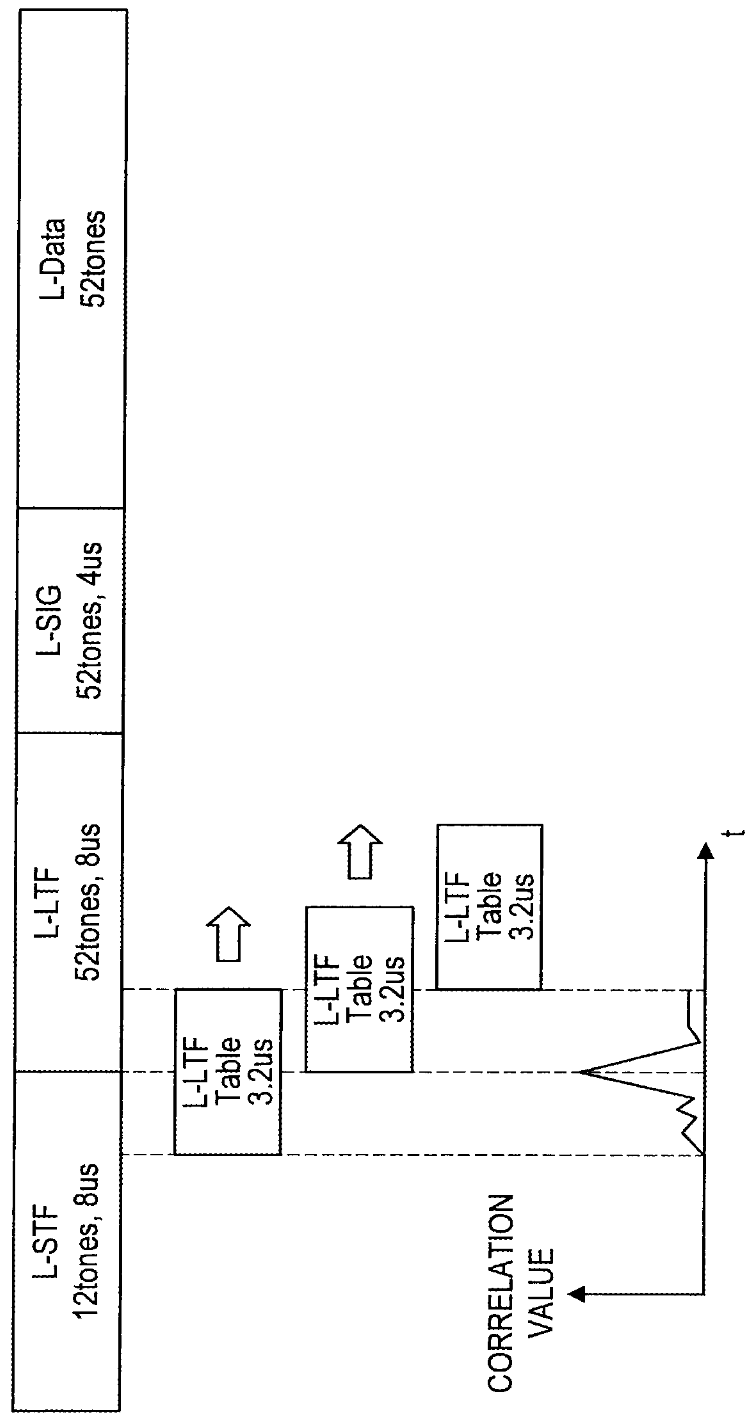
FIG. 5 is an explanatory view conceptually showing an exemplary structure of a preamble and a cross-correlation operation.

FIG. 5 is an explanatory view conceptually showing an exemplary structure of a preamble and a cross-correlation operation. Referring to FIG. 5, the preamble includes L-STF (Short Training Field), L-LTF (Long Training Field) and L-SIG, followed by data (L-Data).

In the L-STF (first synchronous signal), a known signal pattern with a period of 0.8 μs is repeated ten times.

In the L-LTF (second synchronous signal), after the latter half (1.6 μs) of a known signal pattern with a period of 3.2 μs, the signal pattern is repeated two times (8 μs in total). Specifically, the latter half of the signal pattern added at the head of the L-LTF functions as a guard interval.

The L-SIG includes information such as a transmission rate or a modulation scheme of data included in the frame. Such a preamble may be prestored in the base station 10 and the radio communication device 20 as a time-domain signal.

Figure 6:
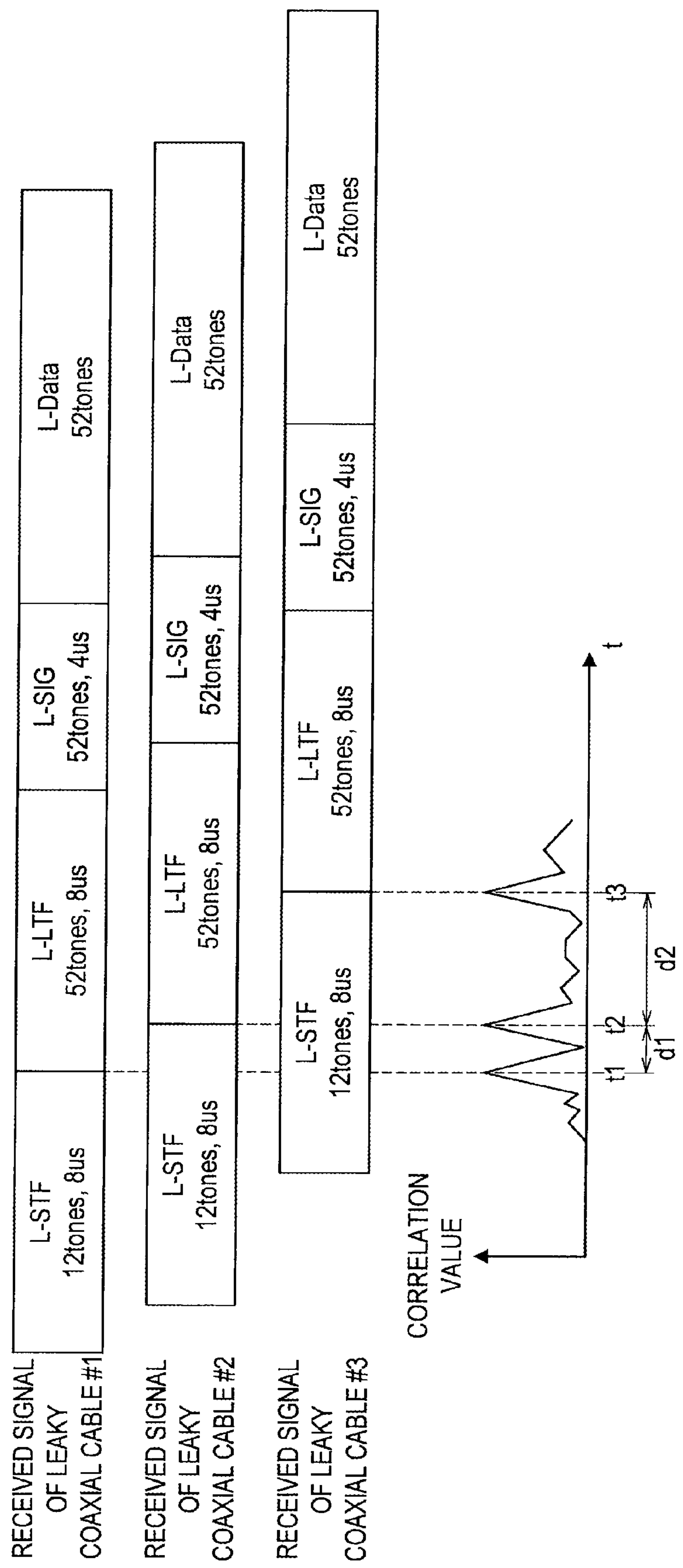
FIG. 6 is an explanatory view showing synchronous timing of received signals of leaky coaxial cables #1 to #3.

The synchronous unit/detection unit 152 performs cross-correlation or autocorrelation of the L-STF and thereby detects rough synchronous timing. Further, as shown in FIG. 5, the synchronous unit/detection unit 152 performs cross-correlation of the L-LTF around the rough synchronous timing detected based on the L-STF and thereby detects a peak position of a correlation value as synchronous timing. As shown in FIG. 6, the synchronous unit/detection unit 152 performs such synchronous processing for each of received signals received by the leaky coaxial cables #1 to #3.

FIG. 6 is an explanatory view showing the synchronous timing of received signals of the leaky coaxial cables #1 to #3. In the example shown in FIG. 6, the synchronous timing of the L-LTF of the received signal of the leaky coaxial cable #1 is t1, the synchronous timing of the L-LTF of the received signal of the leaky coaxial cable #2 is t2, and the synchronous timing of the L-LTF of the received signal of the leaky coaxial cable #3 is t3.

Further, the synchronous unit/detection unit 152 detects differences in the synchronous timing of the respective received signals of the leaky coaxial cables #1 to #3. For example, the synchronous unit/detection unit 152 detects a difference d1 between the synchronous timing t1 of the received signal of the leaky coaxial cable #1 and the synchronous timing t2 of the received signal of the leaky coaxial cable #2 and a difference d2 between the synchronous timing t2 of the received signal of the leaky coaxial cable #2 and the synchronous timing t3 of the received signal of the leaky coaxial cable #3.

(Adjustment of Transmission Timing)

The propagation characteristics of a communication path (uplink) from the radio communication device 20 to the base station 10 is substantially equivalent to the propagation characteristics of a communication path (downlink) from the base station 10 to the radio communication device 20. Accordingly, the time taken from transmission of a radio signal by the radio communication device 20 to reception of the radio signal by a certain leaky coaxial cable is also considered to be equivalent to the time taken from transmission of a radio signal by the certain leaky coaxial cable to reception of the radio signal by the radio communication device 20.

Thus, the transmission timing adjustment unit 154 according to the embodiment adjusts the transmission timing of radio signals from the leaky coaxial cables #1 to #3 based on the differences in the synchronous timing of the received signals of the leaky coaxial cables #1 to #3 detected by the synchronous unit/detection unit 152.

For example, the transmission timing adjustment unit 154 may adjust the transmission timing of radio signals from the leaky coaxial cables #1 to #3 in such a way that a difference in the synchronous timing of radio signals to be transmitted from the leaky coaxial cables #1 to #3 in the radio communication device 20 falls within a predetermined range. If the predetermined range is set to a time range of a guard interval added to each OFDM symbol, it is possible to suppress degradation of reception characteristics due to interference between OFDM symbols in the radio communication device 20.

Further, the transmission timing adjustment unit 154 may adjust the transmission timing in such a way that the synchronous timing of radio signals to be transmitted from the leaky coaxial cables #1 to #3 in the radio communication device 20 coincides with one another. A specific example of processing by the transmission timing adjustment unit 154 is described hereinafter with reference to FIG. 7.

Figure 7:
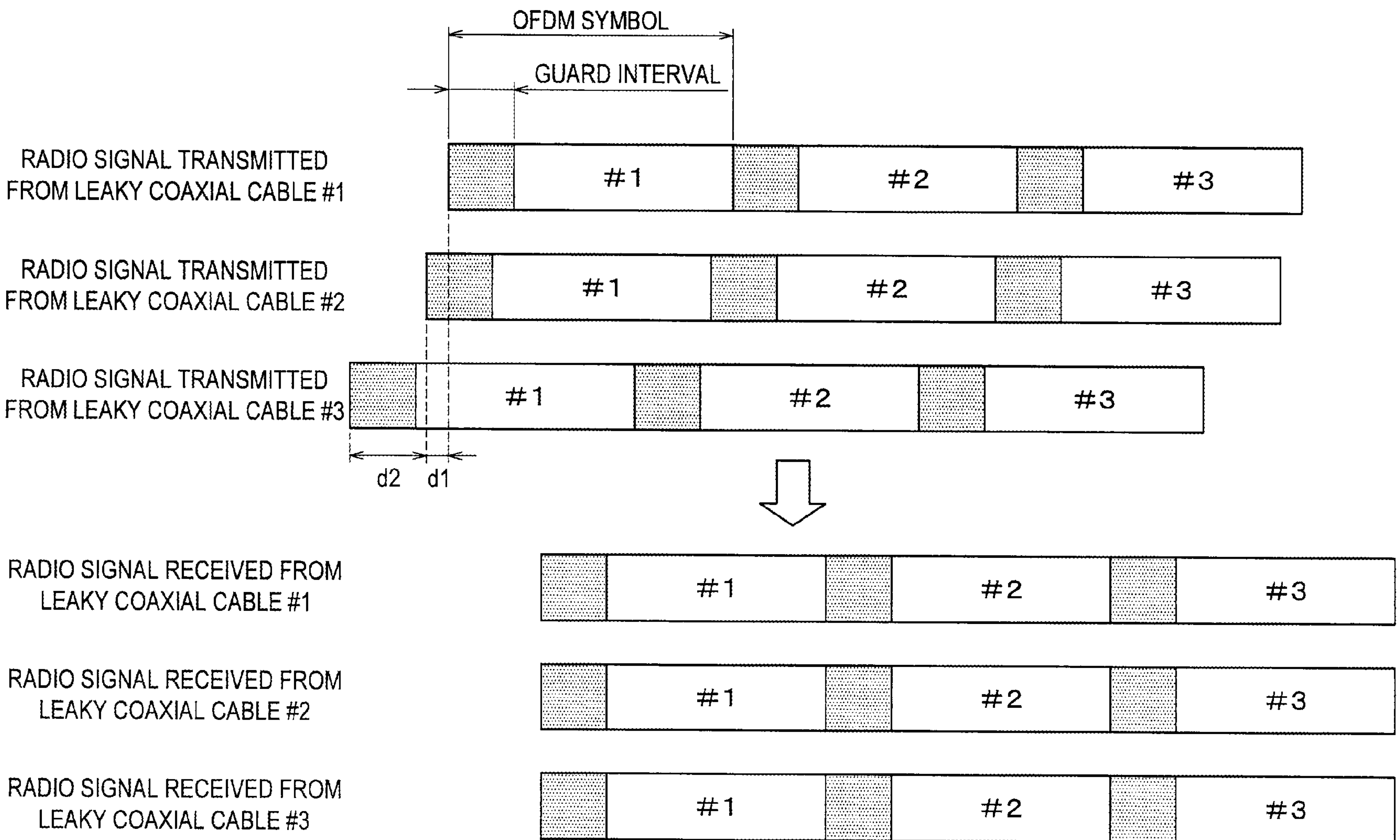
FIG. 7 is an explanatory view showing a specific example of processing by a transmission timing adjustment unit.

FIG. 7 is an explanatory view showing a specific example of processing by the transmission timing adjustment unit 154. Specifically, FIG. 7 shows a specific example of processing that is performed by the transmission timing adjustment unit 154 in the case where differences in the synchronous timing of received signals of the leaky coaxial cables #1 to #3 are as shown in FIG. 6.

Because the synchronous timing of a received signal of the leaky coaxial cable #3 is the latest in the example shown in FIG. 6, the transmission timing adjustment unit 154 sets the transmission timing of a radio signal by the leaky coaxial cable #3 to be at the head as shown in FIG. 7.

Then, the transmission timing adjustment unit 154 adjusts the transmission timing of a radio signal by the leaky coaxial cable #2 to the timing with the difference d2 from the transmission timing of the radio signal by the leaky coaxial cable #3. Specifically, the transmission timing adjustment unit 154 may delay a radio signal supplied from the preamble adding unit 122 and to be transmitted from the leaky coaxial cable #2 by the time corresponding to the difference d2 and supply the delayed radio signal to the DAC 124.

Further, the transmission timing adjustment unit 154 adjusts the transmission timing of a radio signal by the leaky coaxial cable #1 to the timing with the difference d1 from the transmission timing of the radio signal by the leaky coaxial cable #2. Specifically, the transmission timing adjustment unit 154 may delay a radio signal supplied from the preamble adding unit 122 and to be transmitted from the leaky coaxial cable #1 by the time corresponding to the sum of the difference d1 and the difference d2 and supply the delayed radio signal to the DAC 124.

As a result of the above-described adjustment by the transmission timing adjustment unit 154, the synchronous timing, i.e. the reception timing, of the respective radio signals received by the radio communication device 20 from the leaky coaxial cables #1 to #3 coincides with one another as shown in the lower part of FIG. 7. It is thereby possible to suppress interference between OFDM symbols transmitted from the leaky coaxial cables #1 to #3 in the radio communication device 20 and improve the reception characteristics of the radio communication device 20.

Note that the base station 10 may include a buffer that stores differences in the synchronous timing of received signals of the leaky coaxial cables #1 to #3 detected by the synchronous unit/detection unit 152 with respect to each of the other ends of communication, and the transmission timing adjustment unit 154 may adjust the transmission timing by referring to the buffer. Further, because differences in the synchronous timing of received signals of the leaky coaxial cables #1 to #3 vary when the other end of communication moves, the base station 10 may update the contents of the buffer at every reception from the other end of communication.

(Adjustment of Reception Timing)

The reception timing adjustment unit 156 adjusts supply of received signals of the leaky coaxial cables #1 to #3 to the synchronous unit/detection unit 152 based on the differences in synchronous timing detected by the synchronous unit/detection unit 152. For example, the reception timing adjustment unit 156 performs the adjustment in such a way that the synchronous timing of received signals of the leaky coaxial cables #1 to #3 coincides with one another. A specific example of processing by the reception timing adjustment unit 156 is described hereinafter with reference to FIG. 8.

Figure 8:
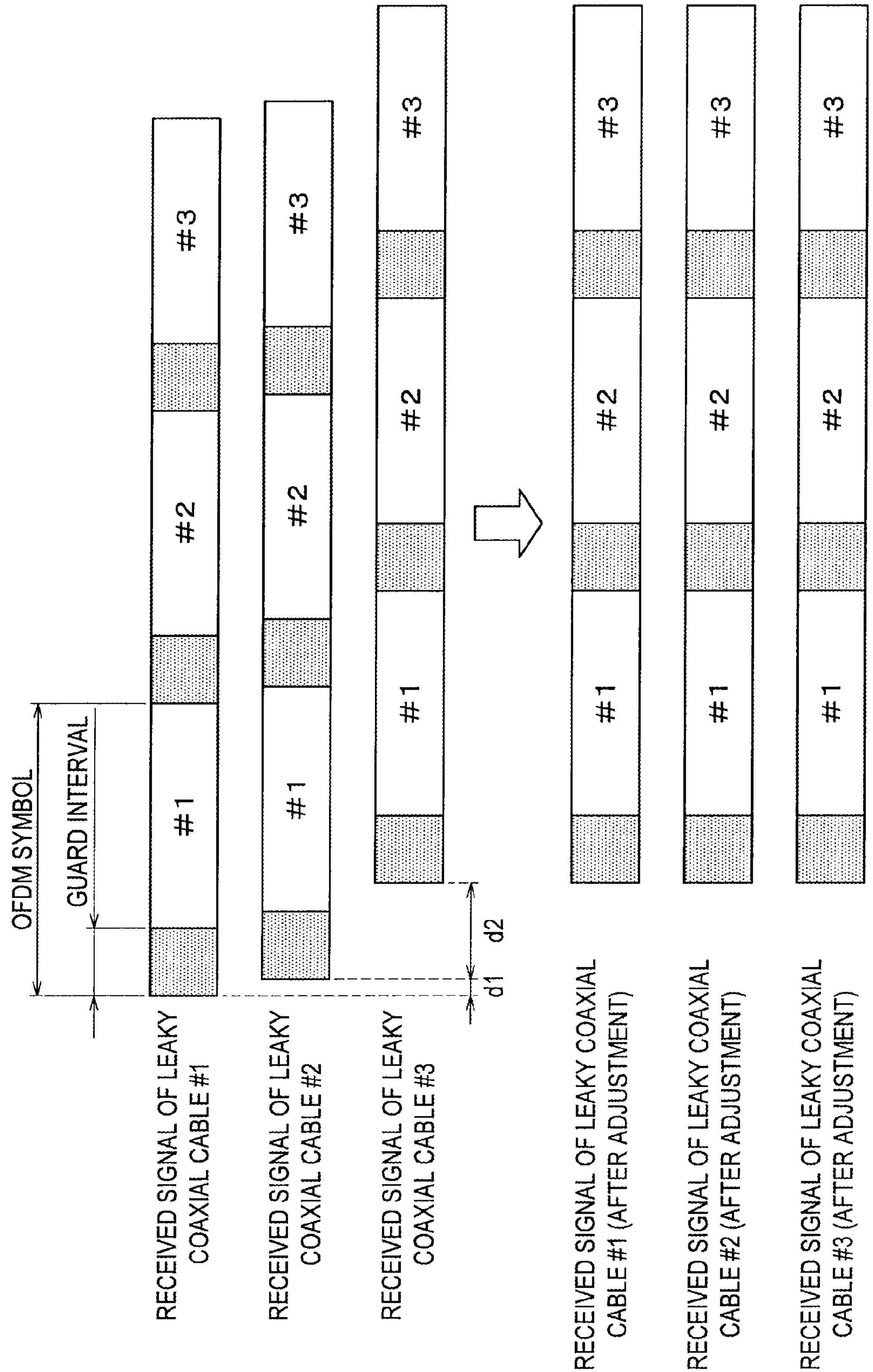
FIG. 8 is an explanatory view showing a specific example of processing by a reception timing adjustment unit.

FIG. 8 is an explanatory view showing a specific example of processing by the reception timing adjustment unit 156. In the example shown in FIG. 8, the reception timing of the leaky coaxial cable #1 is the earliest, a difference between the reception timing of the leaky coaxial cable #1 and the reception timing of the leaky coaxial cable #2 is d1, and a difference between the reception timing of the leaky coaxial cable #2 and the reception timing of the leaky coaxial cable #3 is d2.

In this case, because the reception timing of the leaky coaxial cable #3 is the latest, the reception timing adjustment unit 156 supplies a received signal of the leaky coaxial cable #3 to the synchronous unit/detection unit 152 as it is.

On the other hand, the reception timing adjustment unit 156 sets the synchronous timing of a received signal of the leaky coaxial cable #2 to coincide with the synchronous timing of the received signal of the leaky coaxial cable #3. Specifically, the reception timing adjustment unit 156 may delay the received signal of the leaky coaxial cable #2 by the time corresponding to the difference d2 and supply the delayed received signal to the synchronous unit/detection unit 152.

Likewise, the reception timing adjustment unit 156 sets the synchronous timing of a received signal of the leaky coaxial cable #1 to coincide with the synchronous timing of the received signal of the leaky coaxial cable #3. Specifically, the reception timing adjustment unit 156 may delay the received signal of the leaky coaxial cable #1 by the time corresponding to the sum of the difference d1 and the difference d2 and supply the delayed received signal to the synchronous unit/detection unit 152.

As a result of the above-described adjustment by the reception timing adjustment unit 156, the synchronous timing of the respective received signals of the leaky coaxial cables #1 to #3 coincides with one another. In other words, the supply timing of the OFDM symbols respectively constituting the received signals of the leaky coaxial cables #1 to #3 coincides with one another. Note that the synchronous unit/detection unit 152 may feed back the detected differences in synchronous timing to the reception timing adjustment unit 156 after the adjustment.

<4. Operation of Radio Communication System>

The configuration of the base station 10 according to the embodiment is described above. Hereinafter, an operation of the radio communication system 1 according to the embodiment is described with reference to FIG. 9.

FIG. 9 is a sequence chart showing an operation of the radio communication system 1 according to the embodiment. Referring to FIG. 9, the radio communication device 20 first transmits a radio signal (S204). Next, the leaky coaxial cable #1 receives the radio signal transmitted from the radio communication device 20, and the received signal is supplied to the configuration for reception in the base station 10 (S208). Then, the leaky coaxial cable #2 receives the radio signal transmitted from the radio communication device 20, and the received signal is supplied to the configuration for reception in the base station 10 (S212). Further, the leaky coaxial cable #3 receives the radio signal transmitted from the radio communication device 20, and the received signal is supplied to the configuration for reception in the base station 10 (S216).

After that, the synchronous unit/detection unit 152 detects differences in the reception timing of the radio signal by the leaky coaxial cables #1 to #3 (S220). Then, the encoding unit 112, the transmission vector multiplication unit 114, the primary modulation unit 116, the OFDM modulation unit 118, the guard interval adding unit 120, the preamble adding unit 122 and so on of the base station 10 generate transmission signals to be transmitted from the leaky coaxial cables #1 to #3 (S224).

Then, the transmission timing adjustment unit 154 adjusts the transmission timing of radio signals from the leaky coaxial cables #1 to #3 based on the differences in the reception timing of the radio signal by the leaky coaxial cables #1 to #3 detected in the step S220 (S228). Specifically, the transmission timing adjustment unit 154 adjusts the timing to start supply of the transmission signals to the leaky coaxial cables #1 to #3.

As a result of the above-described adjustment by the transmission timing adjustment unit 154, the transmission signals are supplied to the leaky coaxial cables #1 to #3 in the reverse order to the reception timing, and the leaky coaxial cables #1 to #3 transmit radio signals based on the supplied transmission signals. Specifically, the transmission signals are supplied to the leaky coaxial cables #1 to #3 in the sequence of the leaky coaxial cable #3, the leaky coaxial cable #2 and the leaky coaxial cable #1, and the leaky coaxial cables #1 to #3 transmit radio signals in the sequence of the leaky coaxial cable #3, the leaky coaxial cable #2 and the leaky coaxial cable #1 (S232, S236, S240).

In this process, a difference in the reception timing of the radio signals transmitted from the respective leaky coaxial cables #1 to #3 decreases. As a result, it is possible to suppress interference between OFDM symbols transmitted from the leaky coaxial cables #1 to #3 in the radio communication device 20 and improve the reception characteristics of the radio communication device 20. Further, because interference in the radio communication device 20 can be suppressed regardless of the positional interval of the leaky coaxial cables #1 to #3, it is possible to improve the layout flexibility of the leaky coaxial cables #1 to #3.

<5. Alternative Example>

Although the example in which the synchronous unit/detection unit 152 performs synchronous detection of the respective received signals of the leaky coaxial cables #1 to #3 and detects a difference in the synchronous timing as a difference in the reception timing among the leaky coaxial cables #1 to #3 is described above, the embodiment is not limited thereto. For example, the base station 10 may detect a difference in the reception timing by using a calibration packet transmitted to and received from the radio communication device 20 at the time of pair-wise calibration.

MIMO communication is classified broadly into two types: an open-loop type that does not perform multiplication of a transmission vector at a transmitting end and a closed-loop type that performs multiplication of a transmission vector at a transmitting end. In the closed-loop type, calibration of an RF circuit (the transmission analog processing unit 126, the reception analog processing unit 146) and antennas (the leaky coaxial cables) is performed.

Figure 10:
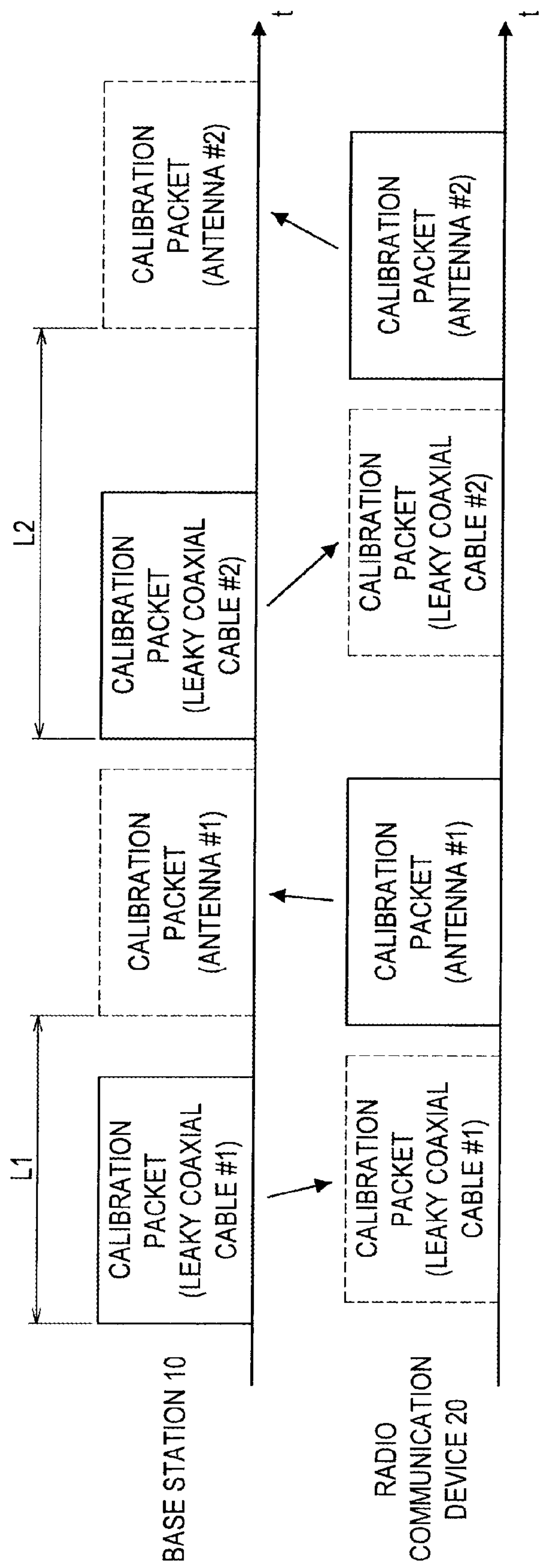
FIG. 10 is an explanatory view showing an exemplary sequence of pair-wise calibration.

Among techniques of calibration are self-calibration that performs calibration in a self-contained manner in the base station 10 and pair-wise calibration that performs calibration by executing a calibration sequence in advance between the base station 10 and the radio communication device 20. FIG. 10 shows an exemplary sequence of the pair-wise calibration.

FIG. 10 is an explanatory view showing an exemplary sequence of the pair-wise calibration. In the pair-wise calibration, the base station 10 and the radio communication device 20 sequentially transmit known calibration packets from their leaky coaxial cables or antennas.

Specifically, referring to FIG. 10, when the base station 10 transmits a calibration packet from the leaky coaxial cable #1, the radio communication device 20 transmits a calibration packet from the antenna #1 in response to the transmitted calibration packet. Further, after the base station 10 transmits a calibration packet from the leaky coaxial cable #2, the radio communication device 20 transmits a calibration packet from the antenna #2.

A time interval from reception of a calibration packet from the leaky coaxial cable #1 to transmission of a calibration packet in the radio communication device 20 is known. Likewise, a time interval from reception of a calibration packet from the leaky coaxial cable #2 to transmission of a calibration packet in the radio communication device 20 is known.

Further, the base station 10 can obtain a time length L1 from transmission of a calibration packet from the leaky coaxial cable #1 to reception of a calibration packet from the radio communication device 20. Likewise, the base station 10 can obtain a time length L2 from transmission of a calibration packet from the leaky coaxial cable #2 to reception of a calibration packet from the radio communication device 20.

Thus, the base station 10 may detect differences in reception timing among the terminators #1 to #3 based on reception of each calibration packet from the radio communication device 20. For example, the base station 10 may calculate a difference between the reception timing by the leaky coaxial cable #1 and the reception timing by the leaky coaxial cable #2 by substituting the above time lengths L1 and L2 into "(L2−L1)/2". The base station 10 can calculate a difference between the reception timing by the leaky coaxial cable #1 and the reception timing by the leaky coaxial cable #3, a difference between the reception timing by the leaky coaxial cable #2 and the reception timing by the leaky coaxial cable #3 or the like in the same way, though not described in detail. Note that, although the case where antenna calibration that is not originally for the purpose of detection of a difference in reception timing (adjustment of transmission timing) is used also for adjustment transmission timing is described above, antenna calibration for the purpose of adjustment of transmission timing may be performed.

<6. Summary>

As described above, according to the embodiment, it is possible to reduce a difference in the reception timing of radio signals respectively transmitted from the leaky coaxial cables #1 to #3 in the radio communication device 20. It is thereby possible to suppress interference between OFDM symbols transmitted from the leaky coaxial cables #1 to #3 in the radio communication device 20 and improve the reception characteristics of the radio communication device 20. It is thus possible to improve the layout flexibility of the leaky coaxial cables #1 to #3.

Further, the above advantage is achieved by incorporating the synchronous unit/detection unit 152 and the transmission timing adjustment unit 154 into the base station 10. Thus, the embodiment has a practical advantage that it is not necessary to incorporate a particular function into the radio communication device 20.

Although a preferred embodiment of the present invention is described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, although the case of using a preamble for synchronization or a packet for calibration for detection of reception timing is described in the above embodiment, the present invention is not limited thereto. As an alternative example, the base station 10 may use a special sequence for detection of reception timing.

Further, although the case where the base station 10 includes three leaky coaxial cables is described in the above embodiment, the present invention is not limited thereto. For example, the base station 10 may include two leaky coaxial cables or four or more leaky coaxial cables. In such a case also, the base station 10 may suppress interference in the radio communication device 20 by adjusting the transmission timing of radio signals by the respective leaky coaxial cables in substantially the same way as in the above embodiment.

Further, it is not always necessary to perform the steps in the processing of the radio communication system 1 in this specification in chronological order according to the sequence shown in the sequence chart. For example, the steps in the processing of the radio communication system 1 may be executed in a different sequence from the sequence shown in the sequence chart or executed in parallel.

Furthermore, it is possible to create a computer program that causes hardware such a CPU, ROM and RAM included in the base station 10 to perform the functions equal to the respective elements of the base station 10 described above. Further, a storage medium that stores such a computer program may be provided.

The present application contains subject matter related to that disclosed in Japanese Priority Patent Application JP 2009-220479 filed in the Japan Patent Office on Sep. 25, 2009, the entire content of which is hereby incorporated by reference.

What is claimed is:

1. A radio communication device comprising:

a plurality of leaky coaxial cables to transmit and receive radio signals;

a detection unit operable to detect a difference in a reception timing of a radio signal, transmitted from another radio communication device, among the plurality of leaky coaxial cables; and a transmission timing adjustment unit operable to adjust a transmission timing of the radio signals, to be respectively transmitted from the plurality of leaky coaxial cables based on the difference in the reception timing detected by the detection unit, wherein the transmission timing adjustment unit adjusts the transmission timing of the radio signals in such a way that a difference in reception timing of the radio signals to be respectively transmitted from the plurality of leaky coaxial cables in the another radio communication device is within a predetermined range, wherein the transmission timing adjustment unit adjusts the transmission timing in such a way that the difference in the reception timing of the radio signals to be respectively transmitted from the plurality of leaky coaxial cables in the another radio communication device is within a time range of a guard interval added to each OFDM symbol, and wherein a synchronous unit detects each synchronous timing of the received radio signal by the plurality of leaky coaxial cables, and wherein the detection unit detects a difference in the synchronous timing of the received radio signals detected by the synchronous unit as the difference in the reception timing.

2. The radio communication device according to claim 1, wherein the transmission timing adjustment unit adjusts the transmission timing in such a way that the reception timing of the radio signals in the another communication device coincides with one another.

3. The radio communication device according to claim 1, wherein the radio communication device calibrates a plurality of antennas of the another radio communication device, and wherein during the antenna calibration:

calibration signals are sequentially transmitted from the plurality of leaky coaxial cables, and the detection unit detects the difference in the reception timing based on the response from the another radio communication device responding to the calibration signals.

4. The radio communication device according to claim 1, further comprising:

a reception timing adjustment unit operable to adjust timing of supplying each of the received radio signals received by the plurality of leaky coaxial cables to the synchronous unit based on the difference in the reception timing detected by the detection unit.

5. A radio communication system comprising:

a radio communication device comprising:

a synchronous unit operable to detect a synchronous timing information of radio signals received via a plurality of leaky coaxial cables, wherein the plurality of leaky coaxial cables are coupled to another radio communication device;

a detection unit operable to detect a difference in a synchronous timing of the received radio signals, among the plurality of leaky coaxial cables, based on the detected synchronous timing information; and a reception timing adjustment unit operable to adjust a reception timing of the received radio signals from the plurality of leaky coaxial cables based on the detected difference in the synchronous timing.

6. The radio communication system of claim 5, comprising an OFDM modulation unit operable to modulate the received radio signals in accordance with an orthogonal frequency division multiplexing modulation (OFDM) scheme, wherein the modulated radio signals comprises a plurality of OFDM symbols.

7. The radio communication system of claim 6, wherein each of the plurality of OFDM symbols comprises a preamble, and wherein the preamble comprises the synchronous timing information.

8. The radio communication system of claim 5, further comprising another radio communication device having a plurality of antennas.

9. The radio communication system of claim 8, further comprising a transmission timing adjustment unit operable to adjust a transmission timing of a radio signal transmitted from the plurality of leaky coaxial cables to the another radio communication device in such a way that the reception timing of the radio signals in the another communication device coincides with one another.

10. A radio communication method comprising:

receiving radio signals transmitted from radio communication device via a plurality of leaky coaxial cables;

detecting a synchronous timing information of the received radio signals;

detecting a difference in a synchronous timing between each of the received radio signals based on the detected synchronous timing information; and adjusting reception timing of the radio signals from the plurality of coaxial cables based on the detected difference in the synchronous timing.

* * * * *